United States Patent

Coats

[15] 3,703,965
[45] Nov. 28, 1972

[54] COMBINATION LUMBER STACKER, STICKER PLACER AND UNLOADER

[72] Inventor: Jesse C. Coats, P.O. Box 167, Horse Shoe Bend, Idaho 83729

[22] Filed: March 8, 1971

[21] Appl. No.: 121,661

[52] U.S. Cl....................................214/6 M, 214/6 DK
[51] Int. Cl.................................................B65g 57/26
[58] Field of Search.......24/6 M, 6 N, 6 P, 6 H, 6 DK

[56] References Cited

UNITED STATES PATENTS

| 1,444,595 | 2/1923 | Lateur | 214/6 M |
| 3,387,720 | 6/1968 | Wilkin | 214/6 M |
| 3,567,047 | 3/1971 | Clausen | 214/6 DK |
| 1,490,594 | 4/1924 | Lateur | 214/6 DK |

Primary Examiner—Robert J. Spar
Attorney—John W. Kraft

[57] ABSTRACT

The apparatus of the present invention may be categorized into four assembly groups, namely an unstacker assembly, a sticker placer assembly, a lumber stacker assembly, and an unloading elevator assembly. The unstacker assembly is juxtapositioned to the sticker placer and stacker assemblies perpendicularly at right angles to the sticker placer and assemblies with respect to their directions of travel. The unstacker assembly of this invention comprises a framework having an endless chain carried thereby, a hopper on the forwardmost discharge end of the conveyor, the forwardmost wall of which is distally disposed above the conveyor to provide an opening operable to provide an exitway for only one course of lumber in a stack placed rectilinearly on the conveyor with respect to the direction of travel of the conveyor, a guide bar mounted on the conveyor endless chain being operable to urge the lowermost course of lumber in the stack through the exitway. The sticker placer assembly comprises a multiplicity of sticker magazine rack assemblies having open upper and lower ends being operable to carry a plurality of stickers in a stack, moving table assembly being operable to be reciprocatingly driven under the rack assemblies and to receive a course of lumber thereon from the unloading assembly, channel grooves in the moving table assembly coincident with respective magazine rack assemblies, means in the respective grooves being operable to urge a sticker out of the magazine rack assembly and to cause stickers to be carried in respective channel grooves. The stacker assembly comprises a reciprocatingly driven frame mounted on the machine framework opposite the moving table having a multiplicity of outwardly projecting foot members operatively engaging respective channel grooves of the moving table assembly, the foot members being operable to raise respective stickers in grooves at an angle so that the raised ends of respective stickers tend to engage adjacent boards on the moving table assembly. The moving table assembly and stacker assembly are opposingly driven to form a bi-parting support for respective stickers and lumber on the moving table assembly. When the moving table assembly and the stacker are opposingly driven lumber in engagement with sticker ends raised by the stacker assembly tends to be supported by the stickers while lumber not in engagement with respective stickers in the channel grooves tends to be carried by the table. Hence the lumber is caused to be spaced apart. At the terminal limits of travel of the respective assemblies the stickers carrying the spaced lumber are dropped onto the unloading elevator assembly. The elevator assembly comprises a multiplicity of support members mounted on the frame being operable to be moved upwardly and downwardly with respect to the sticker placer and stacker assemblies.

5 Claims, 11 Drawing Figures

FIG. 1

JESSE C. COATS  INVENTOR.

JESSE C. COATS  INVENTOR.

FIG. 6

JESSE C. COATS INVENTOR.
BY John W. Kraft

JESSE C. COATS INVENTOR.

BY

COMBINATION LUMBER STACKER, STICKER PLACER AND UNLOADER

FIELD OF INVENTION

The present invention relates to saw mill lumber handling machinery and more particularly to a combination lumber stacking, sticker placing, and unloading machine operable to unload random width, rough sawn boards from a sawmill, to deliver the boards in courses to a sticker placing assembly which is operable to place stickers between courses of boards and to separate the boards into a uniform ventilated stack for drying.

BRIEF DESCRIPTION OF THE PRIOR ART

Lumber sawn from logs received out of a saw mill are usually of random widths because boards are cut from different sections of a log. The handling and storage of such random widths of lumber is difficult. A further consideration in handling newly sawn lumber stems from the fact that logs immediately prior to being sawed are usually placed in a mill pond and the cellular pores of the lumber are saturated with water. Therefore, it is desirable to dry the lumber in order to avoid shrinkage of the lumber when used in construction. It is common practice to space boards at intervals on transversely placed narrow slats called stickers in courses so as to provide uniform ventilation about the boards during the drying processes, either in the open air or in drying kilns. Heretofore, stacking of lumber for drying has been accomplished either entirely by manual labor or by employing manual labor in conjunction with separate machines operable to place stickers between courses of lumber and machines operable to separate lumber in courses upon stickers. In either event separate boards had to be handled.

Accordingly it is an extremely important object of this invention to provide an integral lumber unloading, sticker placing, and lumber stacking machine operable to receive stacks of sawn lumber of random widths in courses from a sawmill, the machine being operable to rectilinearly convey separate courses of lumber to an assembly on the machine operable to place a plurality of stickers transversely under a lumber course, and to provide means in the machine operable to separate the boards at intervals on the stickers to provide lumber in a stock having the opposite terminal edges of the stack uniformly aligned.

These and other objects shall become apparent from the description following, it being understood that modifications may be made without affecting the teachings of the invention here set out.

Generally, the apparatus of the present invention may be categorized into four assembly groups, namely an unstacker assembly, a sticker placer assembly, a lumber stacker assembly, and an unloading elevator assembly. The unstacker assembly is juxtapositioned to the sticker placer and stacker assemblies perpendicularly at right angles to the sticker placer and assemblies with respect to their directions of travel. The unstacker assembly of this invention comprises a framework having an endless chain carried thereby, a hopper on the forwardmost discharge end of the conveyor, the forwardmost wall of which is distally disposed above the conveyor to provide an opening operable to provide an exitway for only one course of lumber in a stack placed rectilinearly on the conveyor with respect to the direction of travel of the conveyor, a guide bar mounted on the conveyor endless chain being operable to urge the lowermost course of lumber in the stack through the exitway. The sticker placer assembly comprises a multiplicity of sticker magazine rack assemblies having open upper and lower ends being operable to carry a plurality of stickers in a stack, moving table assembly being operable to be reciprocatingly driven under the rack assemblies and to receive a course of lumber thereon from the unloading assembly, channel grooves in the moving table assembly coincident with respective magazine rack assemblies, means in the respective grooves being operable to urge a sticker out of the magazine rack assembly and to cause stickers to be carried in respective channel grooves. The stacker assembly comprises a reciprocatingly driven frame mounted on the machine framework opposite the moving table having a multiplicity of outwardly projecting foot members operatively engaging respective channel grooves of the moving table assembly, the foot members being operable to raise respective stickers in grooves at an angle so that the raised ends of respective stickers tend to engage adjacent boards on the moving table assembly. The moving table assembly and stacker assembly are opposingly driven to form a bi-parting support for respective stickers and lumber on the moving table assembly. When the moving table assembly and the stacker are opposingly driven lumber in engagement with sticker ends raised by the stacker assembly tends to be supported by the stickers while lumber not in engagement with respective stickers in the channel grooves tends to be carried by the table. Hence the lumber is caused to be spaced apart. At the terminal limits of travel of the respective assemblies the stickers carrying the spaced lumber are dropped onto the unloading elevator assembly. The elevator assembly comprises a multiplicity of support members mounted on the frame being operable to be moved upwardly and downwardly with respect to the sticker placer and stacker assemblies.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
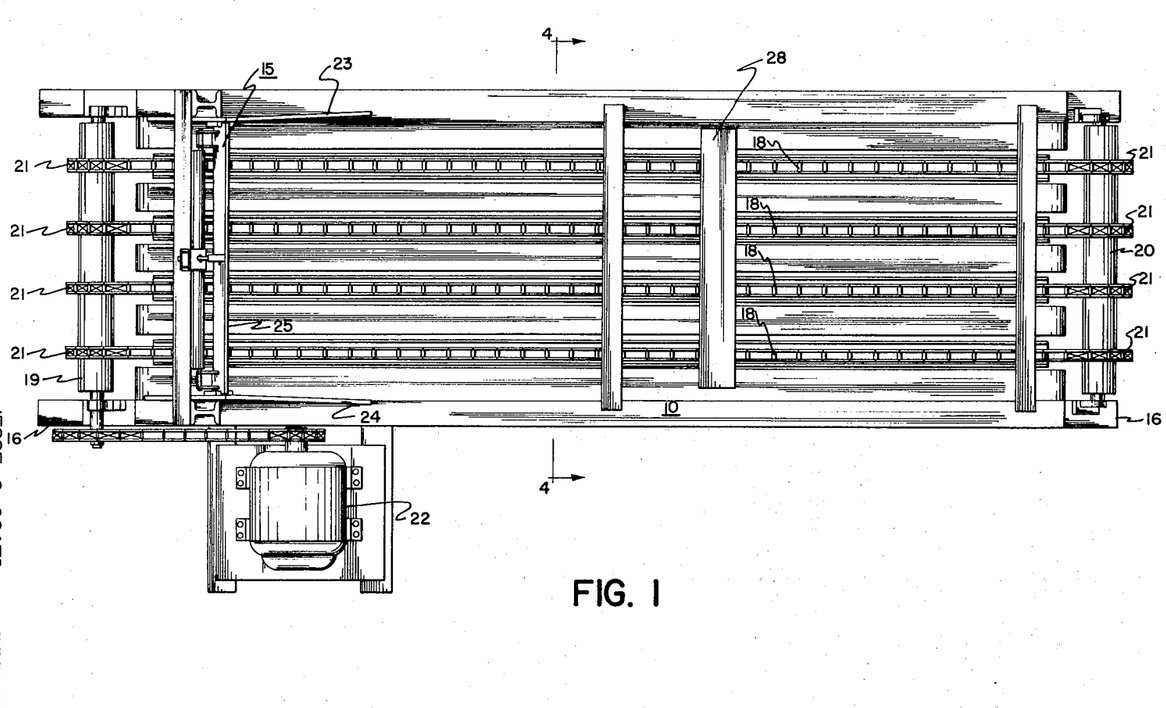
FIG. 1 is a top plan view of the unstacker assembly of this invention showing to advantage the convey chain assembly including the lumber course guide bar and the hopper assembly.
Figure 2:
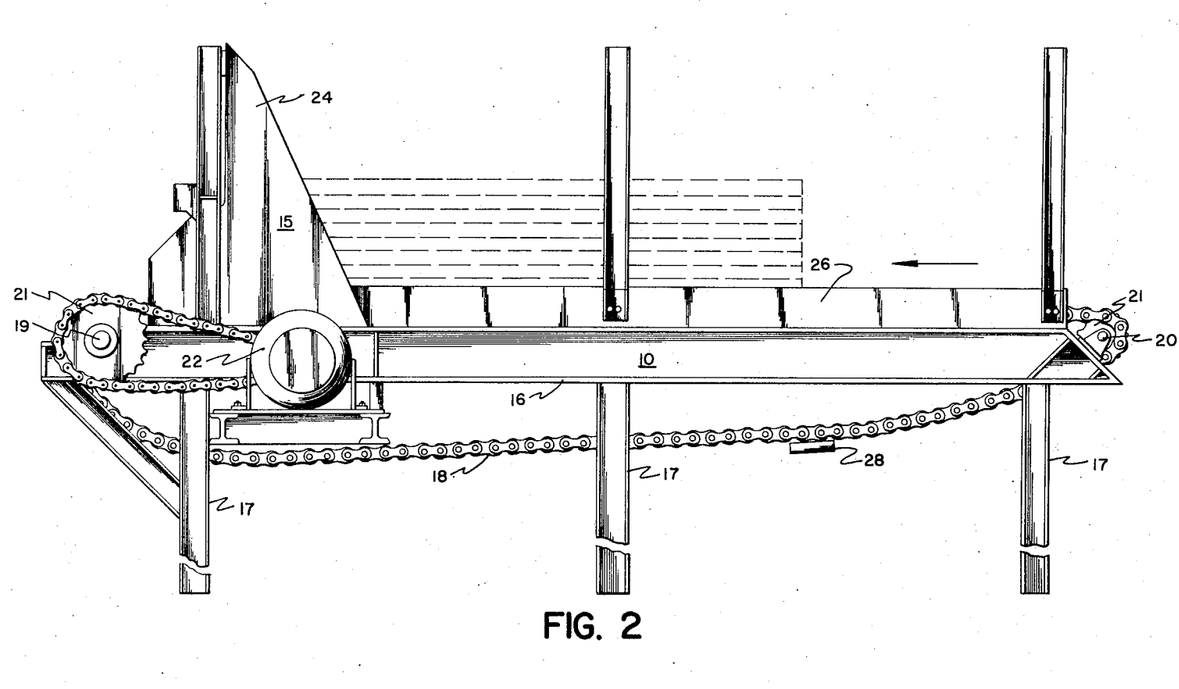
FIG. 2 is a fragmentary side elevational view of the unstacker assembly showing a stack of rectilinearly disposed lumber on the assembly in courses and shown in broken lines for illustrative purposes.
Figure 5:
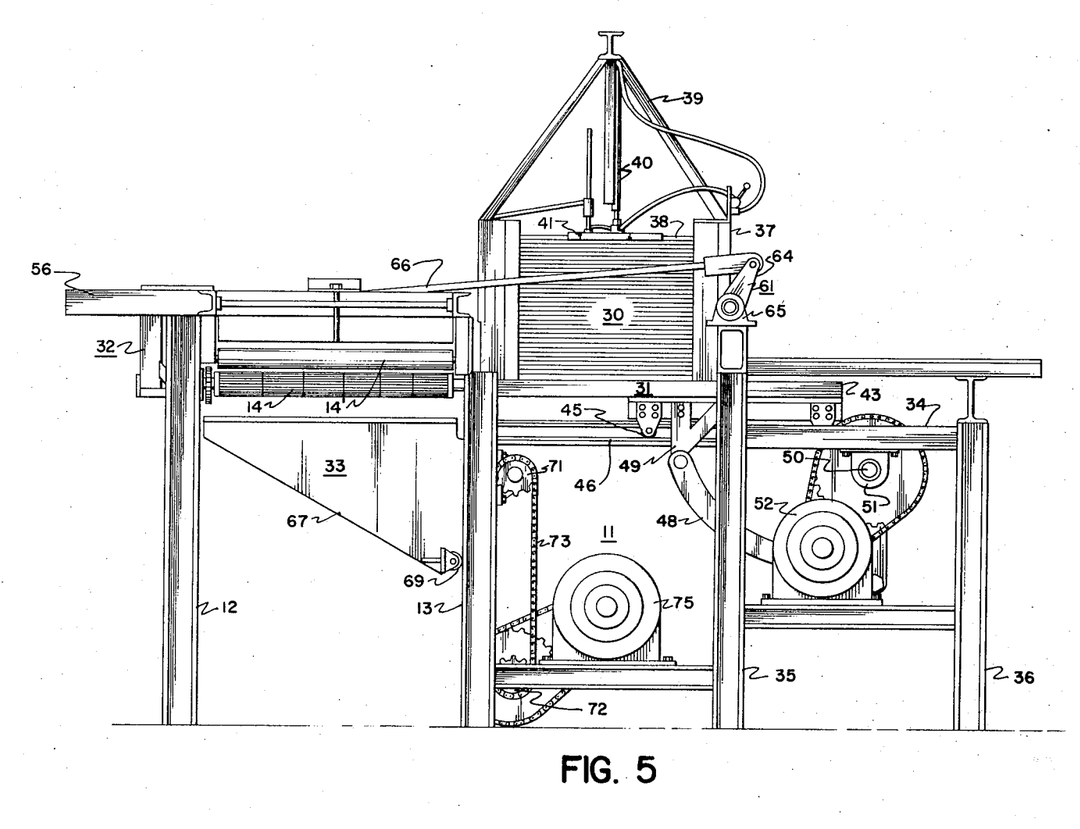
FIG. 5 is a side elevational view of the stacker placer assembly, the stacker assembly and the unloading discharge elevator assembly of this invention with the unstacker assembly of FIG. 1 removed.
Figure 6:
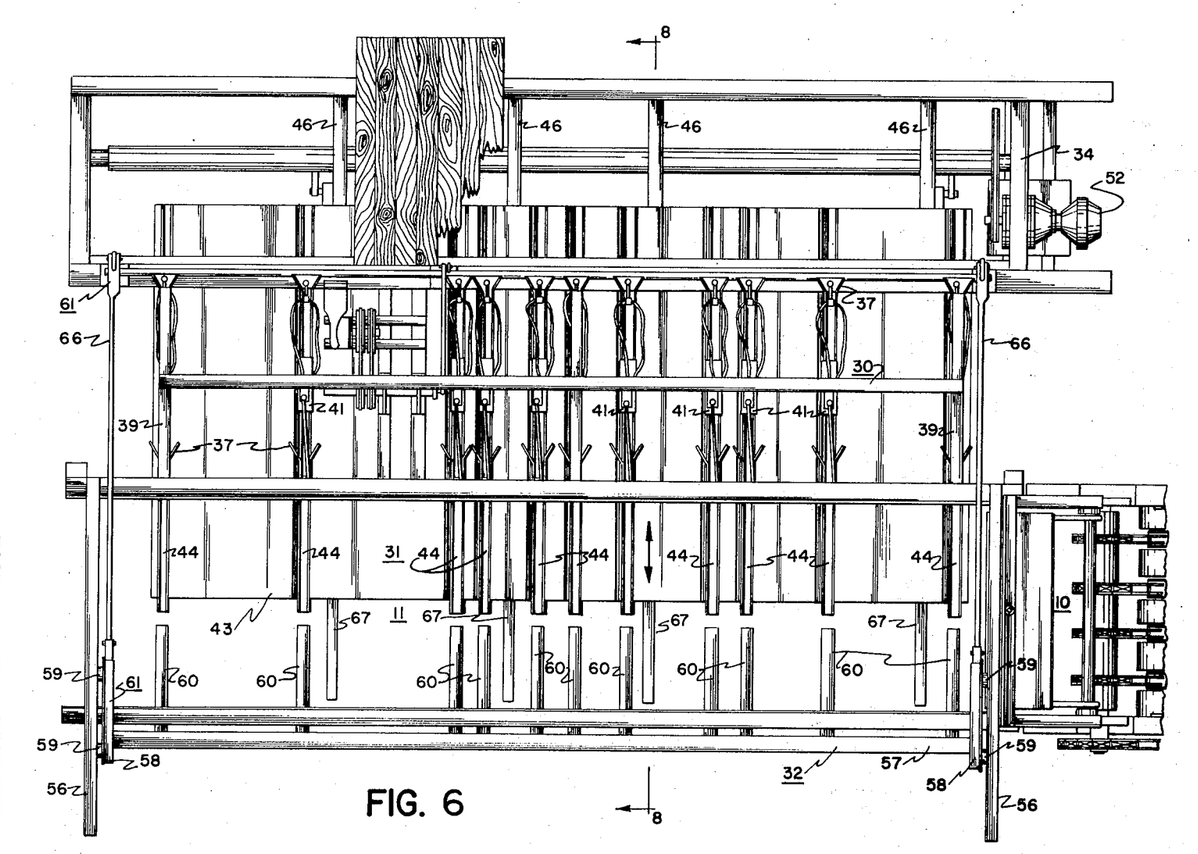
FIG. 6 is a top plan view of the assemblies of this invention showing a fragmentary portion of the unstacker assembly.
Figure 7:
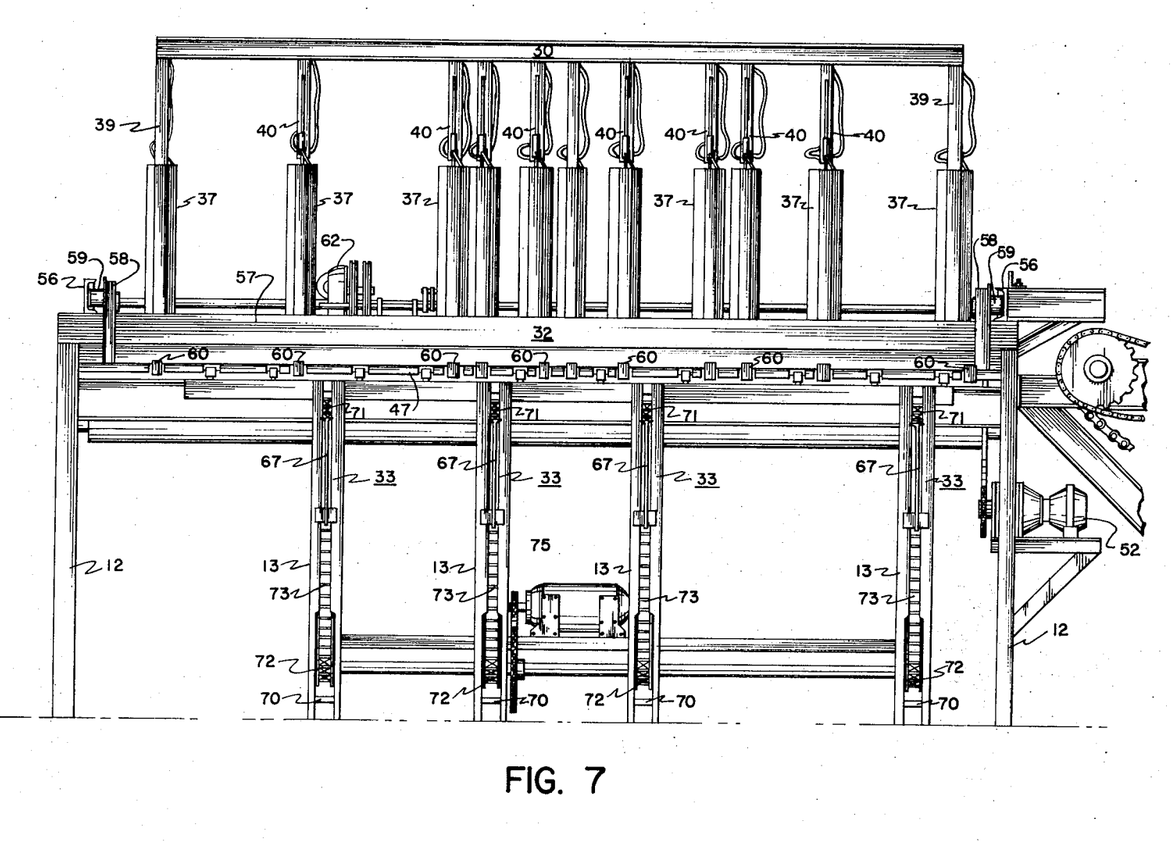
FIG. 7 is a front elevational view of the assemblies of this invention as viewed from the discharge end thereof, however, showing a fragmentary portion of the unstacker assembly.

Referring now to the drawings and more particularly to the FIGS. 1 and 5, the unstacker conveyor assembly identified by the numeral 10 shown to advantage in the FIG. 1 is perpendicularly juxtapositioned to the sticker placer stacker assembly 11 shown to advantage in FIG. 5 and is located adjacent upstanding support columns 12 and 13 of the sticker placer stacker assembly 11 so that lumber is fed rectilinearly on the unstacker conveyor assembly 10 through a pair of feed rollers identified by the numerals 14 and 14' on the sticker placer stacker assembly 11 shown in the FIG. 5. In practice a stack of "shop lumber" including boards of varying widths is caused to be moved onto the unstacker conveyor assembly 10 as a unit and the stack is moved in response to movement of the conveyor on the unstacker conveyor assembly 10 to a fixed upstanding hopper 15 more clearly shown in FIG. 2 and hereinafter later disclosed in detail. It may be noted in the FIG. 2 that boards shown in broken lines for illustrative purposes on the unstacker conveyor assembly 10 are rectilinearly disposed on the assembly 10 with respect to the direction of travel indicated by the arrow. Thereafter, separate courses of boards are fed into the sticker placer stacker assembly 11 from the unstacker conveyor assembly 10 in the manner as hereinafter more fully set out.

Having thus oriented the assemblies of the invention here taught to each other together with a general description of the sequence of operation of the assemblies, a better understanding may be had of the separate assemblies as hereinafter described. Referring again to the plan view of the unstacker assembly 10 in the FIG. 1, the assembly 10 comprises a rectangular table-like framework 16 supported by a multiplicity of columns 17, a multiplicity of endless chains 18 forming a conveyor rectilinearly carried by the framework 16, having a driven shaft 19 and an idler shaft 20 journaled for rotation in the opposite terminal ends of the framework 16, each of the shafts 19 and 20 including respective sprockets 21 suitably fixed to each of the shafts engaging the endless chains 18, a driving means such as motor 22 drivingly connected to the shaft 19 and an upstanding hopper assembly 15 distally disposed near the shaft 19 on the framework 16. The hopper assembly 15 comprises a pair of opposing side walls 23 and 24 and a wall 25 disposed therebetween. The wall 25 is distally disposed above the conveyor chains 18 so that an opening is formed between the wall 25 and the chains 18 substantially as shown in the FIG. 3. A pair of opposing upstanding side walls 26 and 27, more clearly shown in the FIG. 4 are mounted on the frame 16. A guide bar 28 is suitably fastened and carried by the chains 18.

In operation "shop lumber" is stacked in courses of boards having random widths. A stack of lumber is delivered to the unstacker assembly 10. Referring to the FIG. 2, boards shown in broken lines for illustrative purposes in a unit stack are moved rectilinearly by the conveyor chains 18 until they are stopped by the end wall 25. As the guide bar 28 is carried by the chains 18, the bar 28 is caused to engage the lowermost course of boards in the stack and to carry the course of boards through the opening between the end wall 25 and the chains 18.

Figure 3:
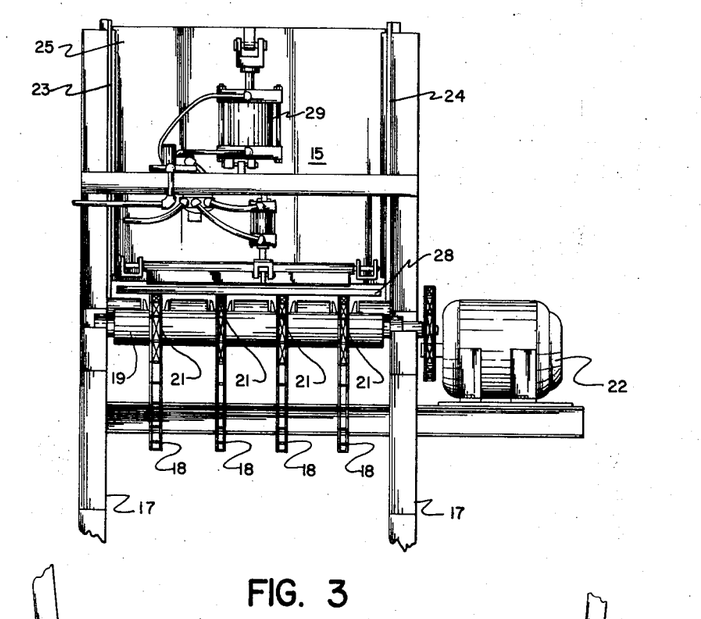
FIG. 3 is a fragmentary front elevational view as viewed from the discharge end.
Figure 4:
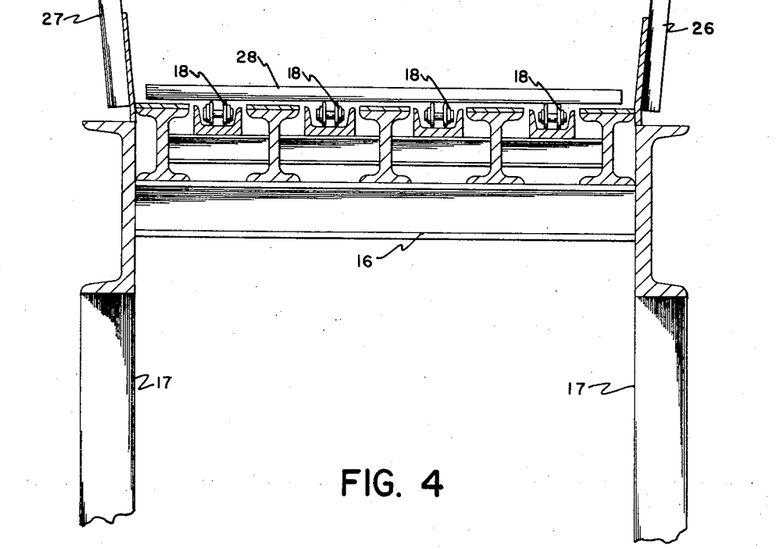
FIG. 4 is a fragmentary cross sectional elevational view of the invention drawn to a larger scale and taken substantially along the lines 4—4 of the FIG. 1.

It is to be understood that means may be provided on the framework 16 such as is shown to advantage in the FIG. 3 to move the wall 25 upwardly and downwardly with respect to the conveyor chains 18. That is to say that the wall 25 may be slidably mounted in channels suitably fastened to the side walls 23 and 24. Means such as piston 29 mounted on the framework 16 having its piston ram connected to the wall 25 may be provided to move the wall 25 upwardly and downwardly. In this manner the opening between the chains 18 and the wall 25 may be selectively varied to provide for different thicknesses of boards.

Referring now to the FIG. 5, boards are carried by guide bar 28 through the opening formed by the end wall 25 and the chains 18 of the unstacker assembly 10 into the feed rollers 14 and 14' of the sticker placer stacker assembly 11. For convenience the assembly 11 may be divided into four principal subassemblies, namely a sticker magazine assembly 30, a moving carriage table assembly 31, a stacker assembly 32 and discharge elevator assembly 33 all of which are carried by a main framework 34. The framework 34 includes a multiplicity of upstanding support columns 12, 13, 35, and 36.

The sticker magazine assembly 30 is centrally mounted on the frame 34 over the moving carriage assembly 31. The magazine assembly 30 includes a plurality of upstanding rack frames 37 rectilinearly mounted with respect to the direction of travel of the carriage assembly 31 as shown to advantage in the FIGS. 5, 6, 7, and 8. Each of the rack frames 37 are operable to hold a multiplicity of stickers 38 one on top of another. Each of the rack frames 37 are provided with an open upper and lower opposing terminal ends. A substantially A-shaped framework 39 is carried by the rack frames 37 and connects the frames 37 together. A plurality of pistons 40 having one of their respective terminal ends connected to the apex of the framework 39 are provided above each of the rack frames 37. An inverted channel-like shoe 41 is suitable fastened to the opposite terminal ends of each of the pistons 40. The shoe 41 is operable to engage the uppermost sticker 38 in respective rack frames 37 and to exert a downward force upon the stickers 38 in response to movement of the respective pistons 40. Suffice it to say that the pistons 40 are operatively connected through valves to a suitable source of air or liquid under pressure. A pivotally mounted stop dog assembly 42 shown to advantage in the FIG. 9 is suitably connected at the lowermost terminal corner of the forwardmost portion of the respective rack frame 37 to engage a sticker 38 moved out of the sticker magazine assembly 30 by the moving carriage assembly 31 to prevent return movement of the sticker 38 to the sticker magazine assembly 30 as hereinafter later more fully described. Stickers 38 are supported in the respective rack frames 37 by the moving carriage assembly 31 as later set out.

The moving carriage assembly 31 comprises a tablelike platform 43 including a multiplicity of reclitinearly disposed sticker channel grooves 44 coincident with respective rack frames 37 of the sticker magazine assembly 30 mounted on wheels 45 carried by channel guide tracks 46 on the frame 34. A lumber stop fence 47 is suitably fixed to the framework 34 transverse to the direction of travel of the moving carriage assembly 31. The fence 47 is distally disposed above the carriage assembly 31 and is operable to stop movement of lumber on the platform 43 when the platform 43 is retracted as hereinafter later described.

Figure 8:
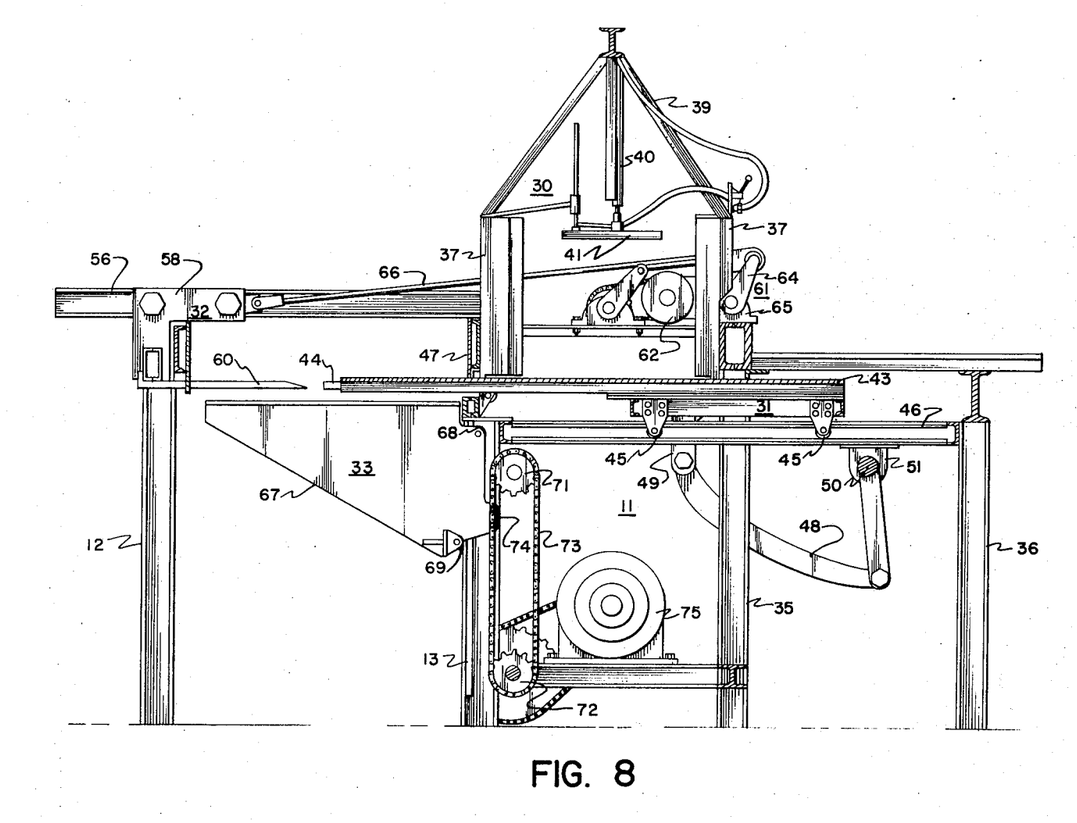
FIG. 8 is a cross sectional elevational view of the sticker placer assembly, the stacker assembly and the unloading discharge elevator assembly of the invention taken substantially along the lines 8—8 of the FIG. 6.
Figure 9:
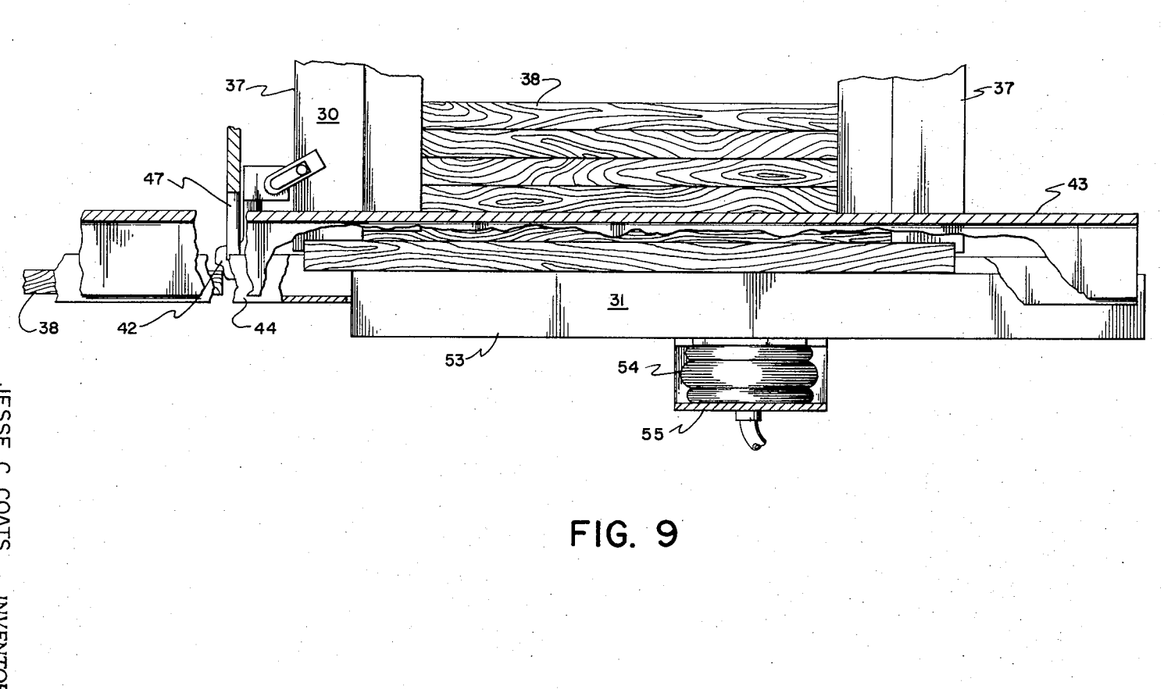
FIG. 9 is a fragmentary cross sectional side elevational view of the sticker magazine rack frame assembly and the rearwardmost portion of the moving platform assembly of the invention drawn to a larger scale and showing to advantage the manner of moving stickers from the sticker magazine rack frame assembly and the manner the stickers are carried in channel groove portions of the moving platform assembly.

Although the moving carriage assembly 31 may be reversably driven on the guide tracks 46 by any suitable means, a pivotally mounted hinged lever arm assembly 48 connected through a bracket 49 at one of its terminal ends to the platform and on a shaft 50 journaled for rotation in bearings 51 is shown to advantage in FIGS. 5 and 8 to cause the platform 43 to be reciprocatingly moved on the guide tracks 46 in response to rotation of the shaft 50. The shaft 50 may be driven through a suitably driven assembly including a power source such as motor 52.

Figure 10:
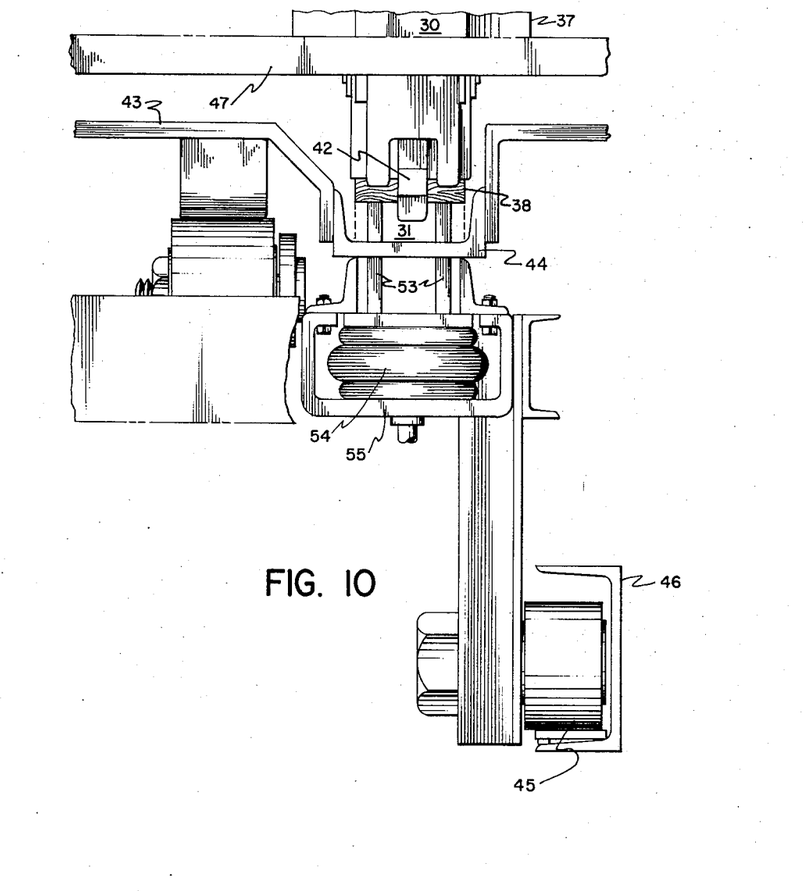
FIG. 10 is a fragmentary front elevational view of the assemblies shown in the FIG. 9 as seen from the forwardmost discharge end of the sticker magazine rack frame assembly.

Referring now to the FIG. 9 showing a fragmentary view of the platform 43 in operating relationship with the sticker magazine assembly 30, a multiplicity of pairs of upstanding dogs 53 are provided to project through slots in the respective channel grooves 44 of platform 43. The dogs 53 are carried by raising and lowering means such as air diaphram 54 mounted in brackets 55 carried on the lowermost side of the platform 43 as shown to advantage in the front elevational view of FIG. 10. The forwardmost terminal edge of the dogs 53 are operable to engage a sticker 38 supported in the rack frame 37 by a channel groove 44 when the dogs 53 are raised in response to movement of the air diaphram 54, the diaphram 54 being connected to a remote source of air under pressure. The dogs 53 are operable to move a sticker 38 out of the rack frame 37 in response to movement of carriage assembly 31 when the dogs 53 are in engagement with a sticker 38 as above described. Suffice it to say that when the dogs 53 are in their lowered position in the channel groove 44, stickers 38 tend to remain in the rack frame 37 and the channel grooves 44 tend to slide beneath the stickers 38 in response to movement of the carriage assembly 31. The pivotally mounted stop-dog assembly 42 suitably connected at the lowermost terminal corner of the forwardmost portion of the respective rack frames 37 is caused to be pivotally moved upwardly in response to movement of a sticker 38 being carried forwardly in respective channel grooves 44 by the respective pairs of dogs 53 in response to the forward movement of the carriage assembly 31. Upon reverse movement of the carriage assembly 31, stickers 38 in channel grooves 44 are engaged by the forwardmost leading edge of respective stop dogs 42 and thereby prevented from movement toward the respective rack frames 37.

Referring again to the FIGS. 6 and 8 which show to advantage the stacker assembly 32 carried on the frame 34 by a pair of channel rails 56 supported by the respective columns 12. The stacker assembly 32 comprises a frame 57 disposed between a pair of stacker carriage brackets 58 including wheels 59 journaled for rotation in the brackets 58 and carried by the channel rails 56 forming a part of the framework 34, a multiplicity of stacker foot members 60 suitably fastened to the lowermost terminal side of the frame 57, and means 61 operable to reversably drive the stacker assembly 32 in the channel rails 56. The stacker foot members 60 are disposed on the frame 57 coincident with each of the channel grooves 44 of the platform 43 on the moving carriage assembly 31. The foot members 60 each have one of their respective terminal ends fastened to the frame 57 so that they project outwardly from the frame 57 to operatively mesh with respective channel grooves 44. The opposite terminal ends of the respective foot members are sharpened to a point and are operable to engage stickers 38 carried in the grooves 44 as hereinafter later described. Although means 61 may comprise any suitable means commonly known in the art operable to reversably drive the stacker assembly 32 of this invention, the drive assembly shown may include a motor 62 drivingly connected through a chain and sprocket assembly 63 to pivot arms 64 journaled for rotation in bearings 65, the arms 64 being connected to a drive rod 66 having its opposite terminal end to respective stacker carriage brackets 58 substantially as shown in the drawings.

Figure 11:
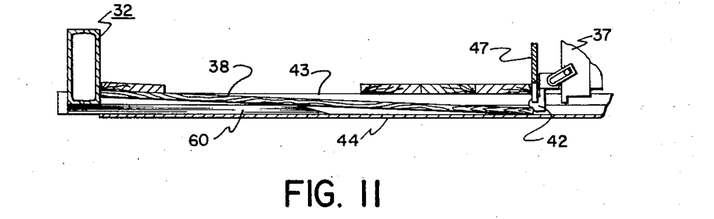
FIG. 11 is a fragmentary cross sectional elevational view of the stacker assembly in engagement with the moving platform assembly of the invention.

In operation, the carriage table assembly 31 and the stacker assembly 32 are driven by respective driving means into operative engagement with each other. It is to be remembered that when carriage table assembly 31 is caused to be moved forwardly stickers 38 are caused to be moved out of the sticker magazine assemblies 30 and to be carried in the channel grooves 44 of the platform 43. The foot members 60 operatively engaging with the channel grooves 44 tend to lift the ends of stickers 38 upwardly in the channel grooves 44 substantially as shown in the FIG. 11. A course of random width "shop lumber" is caused to be fed transversely onto the platform 43 by the feed rollers 14 and 14' out of the unstacker conveyor assembly 30 when the carriage table assembly 31 and the stacker assembly 32 are in operative engagement with each other. Thereafter, the carriage table assembly 31 is caused to be reversably driven away from the stacker assembly 32 and stickers 38 tend to remain in place supported by the respective foot members 60 since the movement of stickers 38 are prevented by the respective stop dogs 42 on the rack frames 37. Because the stickers 38 are supported at an angle on the foot members 60 boards contiguous with the inclined ends of the stickers 38 tend to be supported thereby and remain stationery during movement of the carriage table assembly 31 while other boards on the platform not in engagement with sticker 38 portions in the channel grooves 44 tend to move with the platform 43 toward the fence 47 until stopped thereby. As boards are stopped adjacent the fence 47, the stacker assembly 32 is caused to be moved in the direction opposite the carriage assembly in response to driving means 61. In practice it has been found to advantage to move the carriage table assembly 31 and the stacker assembly 32 at the same rate of speed so that opposite terminal ends of the respective stickers 38 supporting the course of lumber may be dropped simultaneously from the respective assemblies.

Although it is to be understood that courses of lumber carried by stickers 38 as above described may be discharged from the carriage table assembly 31 and stacker assembly 32 onto pallets or the like, it has been found to advantage to provide a discharge elevator assembly substantially as shown and identified by the numeral 33 since the courses of lumber tend to remain less disturbed with respect to the manner in which oriented by the assemblies 31 and 32 when dropped a shorter distance. The discharge elevator assemblies 33 of this invention include a plurality of upstanding, outwardly projecting wing-like arms 67 disposed between the columns 12 and 13 of the framework 34 and carried by each of the columns 13. The columns 13 comprise a pair of opposing channel members spaced apart by elements 70 suitably fastened to the channel. Each of the arms 67 are provided with wheels 68 distally disposed at the uppermost terminal edge of the arms 67 adjacent columns 13 being operable to roll upon the inside portion of the forwardmost flange of the columns 13 and wheels 69 disposed at the lowermost terminal edge of the arms 67 adjacent columns 13 being operable to roll upon the outside portion of the forwardmost flange of the columns 13. A pair of sprockets 71 and 72 carrying a chain 73 are mounted between the channels of the columns 13. Respective slide brackets 74 having one of their terminal edges suitable fastened to the respective chains 73 and the opposite terminal edge suitably fastened to respective arms 67 are provided to carry the arms 67 upwardly and downwardly with respect to the assemblies 31 and 32 in response to movement of the respective sprockets and chains. The sprockets 72 are drivingly connected through suitable driving assemblies to motor driving means 75.

Conventional means may be suitably located on the machine of the present invention to effect operation of the various hydraulic or pneumatic assemblies herein shown and described. Although we have herein shown and described preferred combinations and subcombinations of the present machine and method, it is, of course, to be understood that various changes may be made herein. Moreover, the more advantageous features of the invention, forming sub-assemblies of the complete machine, are usable apart from each other. Accordingly, the invention is not be be considered limited to the structure and uses particularly described herein, but rather only by the scope of the appended claims.

I claim:

1. A combination lumber stacker, sticker placer and unloading machine comprising a substantially L-shaped framework, said framework carrying a lumber unstacker assembly, a multiplicity of sticker placer assemblies, a lumber stacker assembly, an unloading assembly and an elevator means, said lumber unstacker assembly being juxtapositioned to said lumber stacker assembly and being operable to deliver separate successive courses of lumber transversely with respect to directions of travel of said stacker assembly onto said stacker assembly, said sticker placer assemblies being disposed at spaced intervals on said framework vertically above said lumber stacker assembly, said lumber stacker assembly being mounted on wheels carried by said framework for rectilinear movement thereon, said lumber tacker assembly including a table-like platform including a multiplicity of rectilinear channel grooved recesses spaced at intervals coincident with respective said sticker placer assemblies, means operable to reciprocatingly drive said lumber stacker assembly rectilinearly with respect to the framework, said sticker placer assemblies being operable to place stickers in respective channel groove recesses in said stacker assembly, said unloading assembly being mounted on wheels carried by said framework for rectilinear movement thereon and being distally disposed on said framework at the terminal end opposite said multiplicity of sticker placer assemblies, said unloading assembly being juxtapositioned to said lumber stacker assembly, said unloading assembly and said stacker assembly being operable to unload a course of lumber having stickers therebeneath from said lumber stacker assembly, said elevator assembly being mounted on said framework vertically below said unloading assembly and the path of travel of said lumber stacker means, said elevator means including means for moving said elevator means vertically upwardly and downwardly with respect to said unloading assembly.

2. The apparatus of claim 1 in which said unstacker assembly comprises an endless chain conveyor including a lumber guide bar means suitably fastened to said conveyor and carried transversely with respect to the direction of travel of said conveyor, means driving said conveyor, a hopper distally mounted on the framework at the forwardmost discharge end of said conveyor adjacent said lumber stacker assembly, said hopper including a forward wall mounted transversely to the framework with respect to the direction of travel of said conveyor and disposed distally above said conveyor to provide an exitway between said conveyor and said wall being operable to permit movement of one course of lumber through said exitway and to retain other courses of lumber in said hopper and a pair of opposing sidewalls mounted on said framework contiguous with said forward wall, said transversely mounted guide means being operable to engage the lowermost course of lumber in said hopper and to feedingly move said course rectilinearly with respect to the direction of travel of said conveyor in response to movement of said conveyor through said exitway.

3. The apparatus of claim 1 in which each of said sticker placer assemblies comprise an upstanding magazine rack assembly having open upper and lower ends, said magazine assembly being rectilinearly disposed with respect to the directions of travel of said lumber stacker assembly, said magazine being operable to receive a plurality of stickers in a stack, resilient means mounted on said rack assembly operable to engage the uppermost sticker in said rack assembly and to urge said sticker downwardly in said rack assembly into a respective channel groove recess in said lumber stacker assembly, and a stop dog assembly pivotally mounted at the lowermost terminal corner of the forwardmost portion of said rack assembly being operable to pivotally move forwardly in response to the forward movement of a sticker carried in a respective channel groove recess in said lumber stacker assembly and to prevent movement of said sticker when said lumber stacker assembly is reciprocatingly driven in the direction opposite.

4. The apparatus of claim 1 in which said lumber stacker assembly includes sticker engaging means mounted in each of said respective channel groove recesses, means operable to selectively move said sticker engaging means upwardly and downwardly in each of said respective channel groove recesses, a pivotally mounted stop dog disposed at the lower forwardmost portion of each of said sticker placer assemblies operable to engage the terminal end of a sticker in respective channel groove recesses, a multiplicity of sticker engaging members carried by a frame distally carried by said framework at the terminal end opposite said table-like framework, each of said sticker engaging means being disposed on said frame coincident with a respective channel groove recess in said table-like platform and being operable to engage and lift a sticker in said respective channel groove recess, driving means selectively operable to reciprocatingly move said frame, said platform and said sticker engaging means being operable to be moved in directions opposite to unload a course of lumber having stickers at intervals thereunder from said platform and said sticker engaging means.

5. The apparatus of claim 1 in which said elevator means is distally disposed on said framework below said table-like moving platform and said sticker engaging means, said elevator means comprising a multiplicity of outwardly projecting arms carried by said framework, and means to selectively move said arms upwardly and downwardly on said framework with respect to said platform and said sticker engaging means.

* * * * *